United States Patent
Marsolek et al.

(10) Patent No.: US 8,556,039 B2
(45) Date of Patent: Oct. 15, 2013

(54) SYSTEM AND METHOD TO PREVENT PREMATURE WEAR ON KEY SHAFT

(75) Inventors: John L. Marsolek, Watertown, MN (US); Nicholas A. Oetken, Brooklyn Park, MN (US); Nathan L. Mashek, St Michael, MN (US); Eric A. Hansen, Big Lake, MN (US)

(73) Assignee: Caterpillar Paving Products Inc., Minneapolis, MN (US)

( * ) Notice: Subject to any disclaimer, the term of this patent is extended or adjusted under 35 U.S.C. 154(b) by 20 days.

(21) Appl. No.: 13/171,867

(22) Filed: Jun. 29, 2011

(65) Prior Publication Data
US 2013/0000429 A1    Jan. 3, 2013

(51) Int. Cl.
*F16H 57/04*    (2010.01)
*F16N 21/00*    (2006.01)
*F16N 13/16*    (2006.01)
*E01C 19/38*    (2006.01)

(52) U.S. Cl.
USPC ............ 184/6.12; 184/6.19; 184/76; 404/117

(58) Field of Classification Search
USPC .......... 404/117; 474/6.12, 6.19, 76; 184/6.12, 184/6.19, 76
See application file for complete search history.

(56) References Cited

U.S. PATENT DOCUMENTS

| | | | |
|---|---|---|---|
| 2,144,447 A * | 1/1939 | Barnhart | 74/89.23 |
| 2,247,732 A * | 7/1941 | Paton | 184/6.12 |
| 3,659,467 A | 5/1972 | Serrell | |
| 3,721,129 A | 3/1973 | Wallick | |
| 4,108,009 A * | 8/1978 | Fuchigami | 74/61 |
| 4,176,983 A | 12/1979 | Gardner | |
| 4,350,460 A * | 9/1982 | Schmelzer et al. | 404/117 |
| 4,353,261 A * | 10/1982 | Salani | 74/87 |
| 4,523,486 A | 6/1985 | Bueno | |
| 4,993,979 A * | 2/1991 | Bland et al. | 440/75 |
| 6,132,329 A * | 10/2000 | Tison | 475/160 |
| 6,386,794 B1 | 5/2002 | Bitelli | |
| 6,454,051 B1 | 9/2002 | Okayasu | |
| 6,494,806 B2 * | 12/2002 | Tsukada et al. | 476/8 |
| 7,165,469 B2 * | 1/2007 | Niemi et al. | 74/87 |
| 2010/0052442 A1 * | 3/2010 | Savant | 310/78 |
| 2011/0158745 A1 * | 6/2011 | Oetken et al. | 404/72 |

* cited by examiner

*Primary Examiner* — William E Dondero
*Assistant Examiner* — Minh Truong
(74) *Attorney, Agent, or Firm* — Miller, Mattias & Hull

(57) ABSTRACT

A system and method for lubricating a key shaft in a compaction machine is disclosed. The compaction machine may include a spline oil cavity and a key shaft in fluid communication with the spline oil cavity. The key shaft may include an axial splined portion and a helical splined portion on an outer surface thereof, a longitudinal lubricating passage extending through a substantial length of the key shaft and a plurality of additional lubricating passages intersecting the longitudinal lubricating passage. The system and method may additionally include lubricating the axial splined portion and the helical splined portion of the key shaft with the lubricating oil drawn from the spline oil cavity.

12 Claims, 4 Drawing Sheets

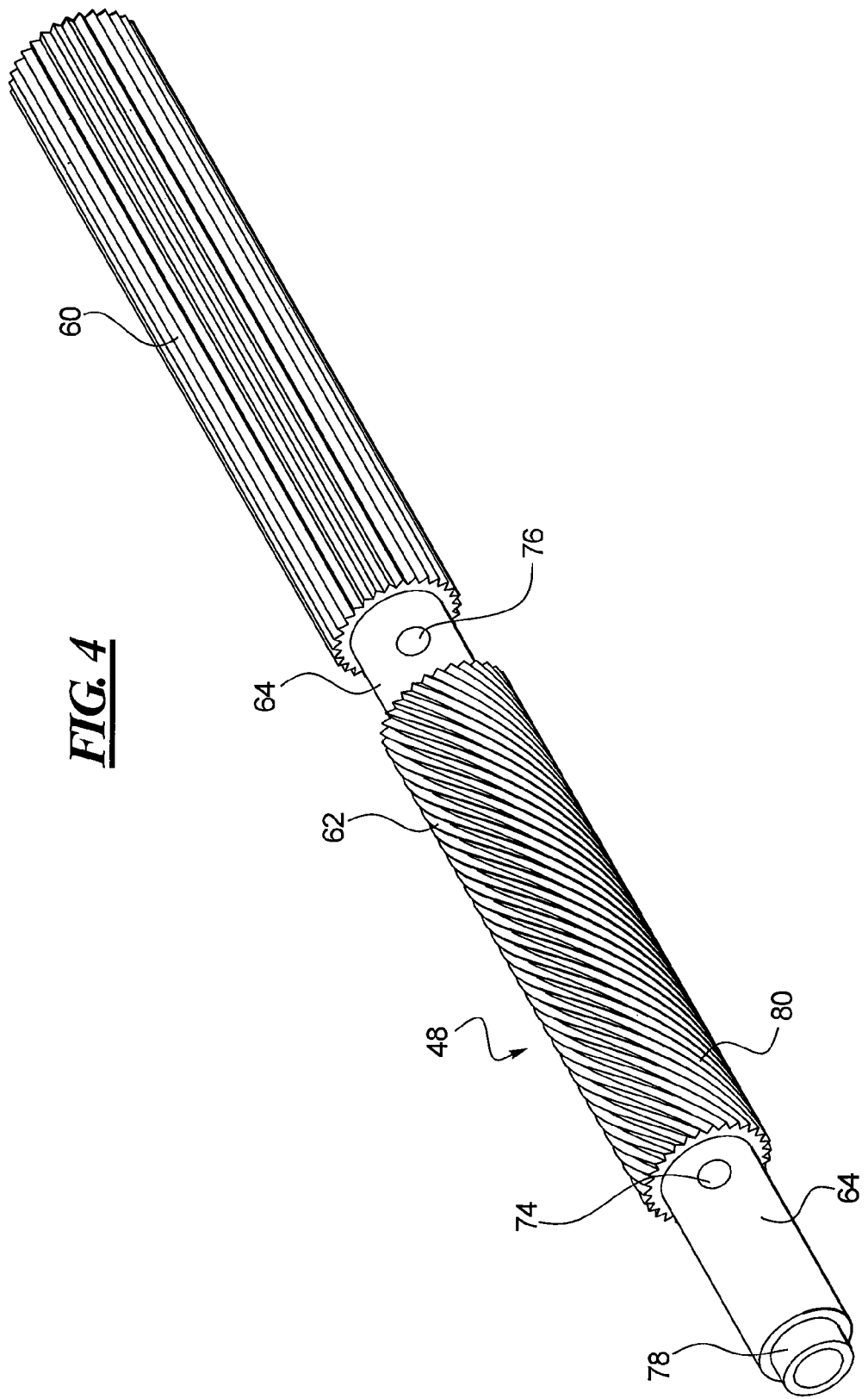

SYSTEM AND METHOD TO PREVENT PREMATURE WEAR ON KEY SHAFT

TECHNICAL FIELD OF THE DISCLOSURE

The present disclosure relates to lubrication and, more particularly, relates to lubrication for preventing premature spline wear on key shaft of a compactor machine.

BACKGROUND OF THE DISCLOSURE

Compaction machines are frequently employed for compacting fresh laid asphalt, soil or other compactable materials. One such type of compaction machine is a drum-type compactor having one or more drums that compacts material over which the compactor is driven. In order to compact the material, these drum-type compactors include a drum assembly having a vibratory mechanism, which includes inner and outer eccentric weights arranged on a rotatable shaft or a key shaft. The key shaft is positioned within an inner cavity of the inner eccentric weight such that as the key shaft rotates, it causes the rotation of the inner and the outer eccentric weights to induce vibrations on the drum for compacting material.

In order to facilitate rotation of the inner and the outer eccentric weights, the key shaft is engaged to those weights by way of various splined structures provided on an outer surface thereof. For example, the outer surface of the key shaft may be provided with axial or straight splined portions that engage with the inner eccentric weight, as well as helical splined portions that engage with the outer eccentric weight to facilitate rotation of those eccentrics. Such continuous engagement, as well as rotation, of the key shaft, the inner and the outer eccentrics causes the splined portions of the key shaft to wear and tear over time. Such wear and tear not only reduces the performance of the key shaft and the inner and the outer eccentric weights to affect the performance of the compaction machine in compacting material, it also reduces the life span of the key shaft requiring frequent and typically expensive replacements.

To prevent and/or minimize wear and tear of the key shaft and, particularly, minimize the wear and tear of the splined portion of the key shaft, lubrication to the key shaft is provided. Generally, the lubrication system provided within the vibratory mechanism for lubricating the inner and the outer eccentric weights, as well as the components of the vibratory system is employed for lubricating the key shaft as well. Although such a system lubricates the key shaft, it only insufficiently lubricates the key shaft, still causing premature wear and tear thereof.

Accordingly, it would be beneficial if a system for sufficiently lubricating the key shaft were developed. It would additionally be beneficial if such a system did not affect the performance of the key shaft, prevented premature spline wear on the key shaft and provided lubrication to the key shaft in a cost effective manner without requiring frequent replacements.

SUMMARY OF THE DISCLOSURE

In accordance with one aspect of the present disclosure, a method of lubricating a key shaft in a compaction machine is disclosed. The method may include providing a spline oil cavity and a key shaft in fluid communication with the spline oil cavity. The key shaft may have an axial splined portion and a helical splined portion on an outer surface thereof, a longitudinal lubricating passage extending through a substantial length of the key shaft and a plurality of additional lubricating passages intersecting the longitudinal lubricating passage. The method may further include drawing lubricating oil from the spline oil cavity into the key shaft through the longitudinal lubricating passage and the plurality of additional lubricating passages and lubricating the axial splined portion and the helical splined portion of the key shaft with the lubricating oil drawn from the spline oil cavity.

In accordance with another aspect of the present disclosure, a lubrication system for a key shaft of a compaction machine is disclosed. The lubrication system may include a housing having an inner eccentric defining a bore therein and a key shaft positioned within the bore of the inner eccentric and reciprocating axially therein, the key shaft may include a longitudinal lubricating passage extending through a substantial length of the key shaft and a plurality of additional lubricating passages intersecting the first lubricating passage. The lubrication system may additionally include a spline oil cavity positioned within the housing in fluid communication with the key shaft.

In accordance with yet another aspect of the present disclosure, a compaction machine is disclosed. The compaction machine may include a vibratory mechanism having an outer eccentric having a helical bore, an inner eccentric having an axial bore and a key shaft positioned within the inner eccentric and engaged with the axial bore for linear motion and engaged with the helical bore of the outer eccentric for rotation. The key shaft may have a longitudinal lubricating passage extending through a substantial length of the key shaft and first and second lubricating oil passages in fluid communication with the longitudinal lubricating passage and positioned substantially transverse therewith. The vibratory mechanism may further include a spline oil cavity in fluid communication with the key shaft.

BRIEF DESCRIPTION OF THE DRAWINGS

FIG. 4 shows the key shaft of FIG. 3 in greater detail.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents along within the spirit and scope of the present disclosure.

DETAILED DESCRIPTION OF THE DISCLOSURE

A system and method for lubricating a key shaft in a compaction machine is disclosed. The compaction machine may include a spline oil cavity and a key shaft in fluid communication with the spline oil cavity. The key shaft in turn may include an axial splined portion and a helical splined portion on an outer surface thereof, a longitudinal lubricating passage extending through a substantial length of the key shaft and a plurality of additional lubricating passages intersecting the longitudinal lubricating passage. The system and method may provide for lubricating the axial splined portion and the helical splined portion of the key shaft with the lubricating oil drawn from the spline oil cavity.

Figure 1:
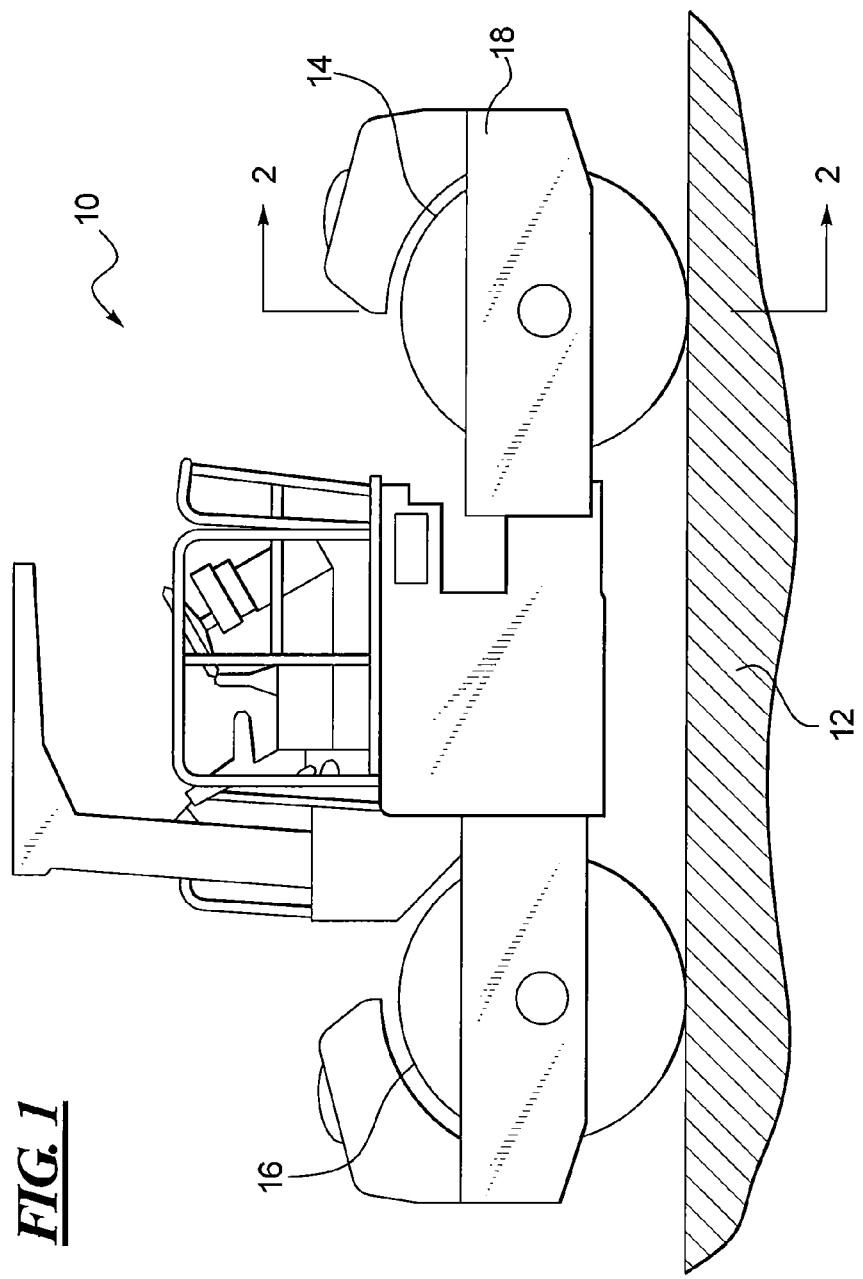
FIG. 1 is a schematic side view of an exemplary compaction machine, in accordance with at least some embodiments of the present disclosure.

Referring now to FIG. 1, a compaction machine 10 is shown, in accordance with at least some embodiments of the present disclosure. The compaction machine 10 in particular is a double drum vibratory compaction machine for compacting and/or increasing the density of a compactable material or mat 12, such as, soil, gravel, and bituminous mixtures. While all the components of the compaction machine 10 have not been shown and/or described, a typical compaction machine may include front and rear compacting drums 14 and 16, respectively, mounted on a main frame 18. The main frame 18 may also support an engine, one or more electrical generators, fluid pumps and/or other power sources, as well as other mechanical and electrical controls for the compaction machine 10. Several components other than those described above and those that are commonly employed in combination or conjunction with such compaction machines are contemplated and considered within the scope of the present disclosure. Furthermore, although the compaction machine 10 is shown as being a double drum machine, in at least some embodiments, the compaction machine may be a single drum machine, or possibly even employ more than two drums as well.

Figure 2:
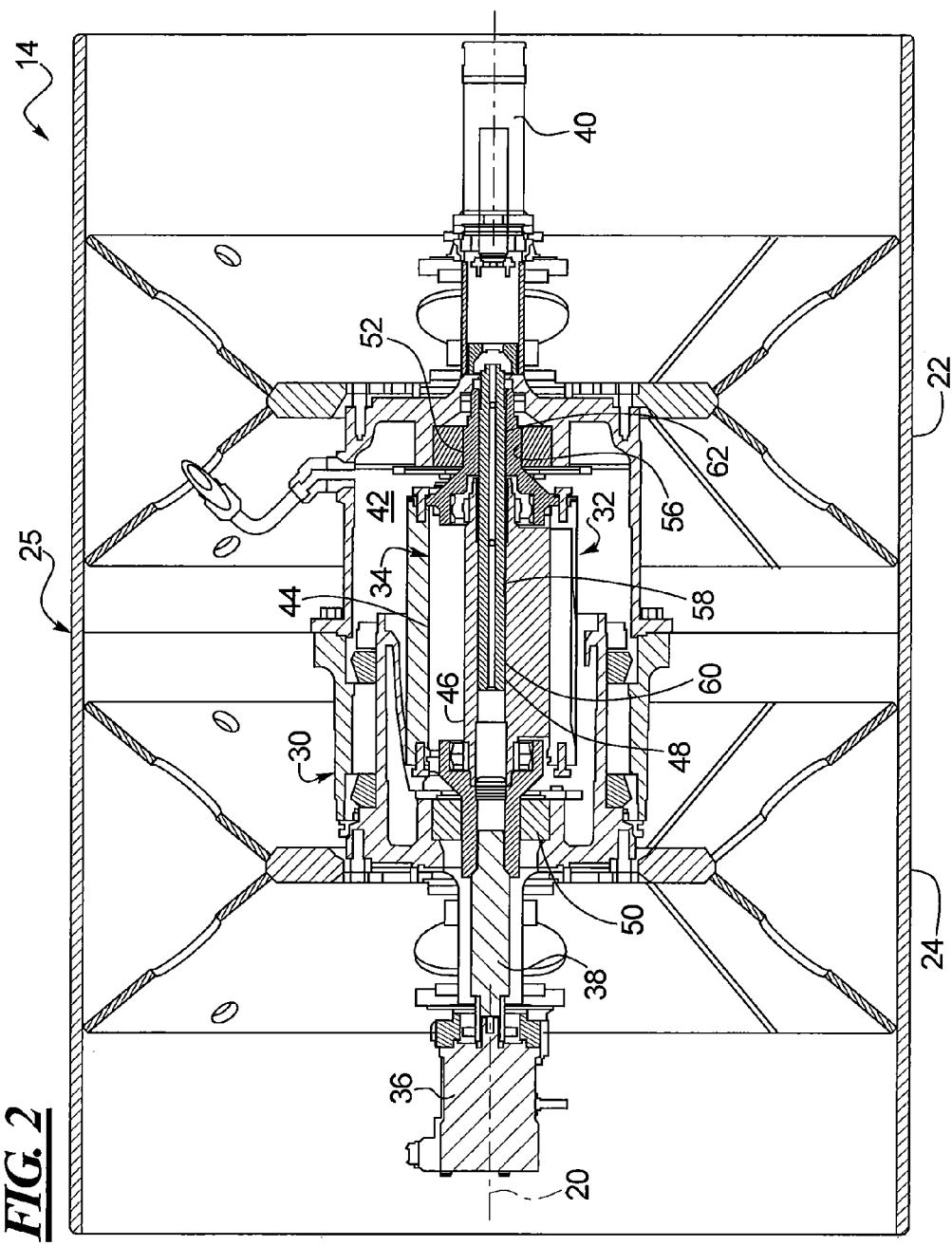
FIG. 2 is an axial cross-sectional view taken along lines 2-2 of FIG. 1 and showing a vibratory system employed within the compaction machine of FIG. 1, in accordance with at least some embodiments of the present disclosure.

Turning now to FIG. 2, a cross-sectional view of the front compacting drum 14 taken along lines 2-2 of FIG. 1 and showing the various components thereof is illustrated, in accordance with at least some embodiments of the present disclosure. While the cross-sectional view of only the front compacting drum 14 has been shown and described herein, it will be understood that the same teachings are equally applicable to the rear compacting drum 16 as well, given especially that the front and the rear compacting drums are structurally and operatively similar. Furthermore, the description of only those components of the front compacting drum 14 that are required for a proper understanding of the present disclosure is provided below.

Thus, as shown in FIG. 2, the front compacting drum 14 may include two drum sections 22 and 24 separated by a split 25 to define a split-drum configuration. In at least some embodiments, the front compacting drum 14 may be configured as a solid-drum configuration with no split as well. Among other components, the drum sections 22 and 24 may include a support arrangement 30 for connecting and rotating those drums sections in relation to one another. The support arrangement 30 may additionally house a vibratory system 32, described below.

In at least some embodiments, the vibratory system 32 may include a vibratory mechanism 34, a vibratory motor 36, a drive shaft 38 and a linear actuator (or cylinder) 40, all of which may be housed within a housing 42. The vibratory motor 36 may be rotatably coupled to rotate the drive shaft 38, which in turn may drive and rotate the vibratory mechanism 34 in conjunction with the linear actuator 40. The vibratory mechanism 34 may include an outer eccentric 44, an inner eccentric 46 and a key shaft 48 connected in operational association with one another. Specifically, the outer eccentric 44 may include a drive side stub shaft 50 connected to the drive shaft 38 and a helical side stub shaft 52 defining a helical bore 56 for engaging and rotating the key shaft 48, in a manner described below. The inner eccentric 46 may be positioned within the outer eccentric 44 and may be rotatably supported about a drum axis 20. A bore (e.g., an axial bore) 58 with one or more splines extending axially parallel to the drum axis 20 may be provided within the inner eccentric 46.

Referring now to FIG. 4 in conjunction with FIG. 2, the key shaft 48 may be a hollow (or substantially hollow) shaft having an axial (or straight) splined portion 60, a helical splined portion 62 and smooth portions 64. The key shaft 48 may additionally have several lubrication passages, which are described in greater detail below. The key shaft 48 may be positioned within the bore 58 of the inner eccentric 46 to engage with both the inner eccentric and the outer eccentric 44 to facilitate rotation of the vibratory mechanism 34. Specifically, the key shaft 48 may be positioned within the bore 58 such that the axial splined portion 60 of the key shaft may engage with the axial splines of the bore to rotatably fix the key shaft in relation to the inner eccentric. Notwithstanding the fact that the key shaft 48 is rotatably fixed within the inner eccentric 46, the key shaft may nonetheless slide axially into the bore 58 of the inner eccentric. Furthermore, the helical splined portion 62 of the key shaft 48 may engage with the helical bore 56 of the outer eccentric 44 to transfer a linear (or axial) motion of the key shaft within the bore 58 into a rotational motion of the key shaft and the inner eccentric 46.

The key shaft 48 may additionally be connected at an end portion thereof to the linear actuator 40, which may facilitate the linear motion of the key shaft within the inner eccentric 46. As the key shaft 48 extends linearly into the axial splines of the bore 58 along the drum axis 20 and engages therewith, a helical spline interface between the helical bore 56 and the helical splined portion 62 is established. This interface converts the linear motion of the key shaft 48 into a rotational motion of the inner eccentric 46 and the key shaft with respect to the outer eccentric 44, thereby rotating the vibratory mechanism 34 and actuating the front compacting drum 14. As the key shaft 48 continuously reciprocates within the inner eccentric 46, the key shaft and, particularly, the axial and the helical splined portions 60 and 62, respectively, of the key shaft undergo wear and tear, thereby decreasing the lifespan of the key shaft and affecting the performance thereof. Insufficient lubrication to the key shaft 48 from a general oil cavity employed for lubricating the components of the vibratory system 32 may still result in premature spline wear of the key shaft. Accordingly, the present disclosure provides a lubrication method to sufficiently lubricate the key shaft 48.

Figure 3:
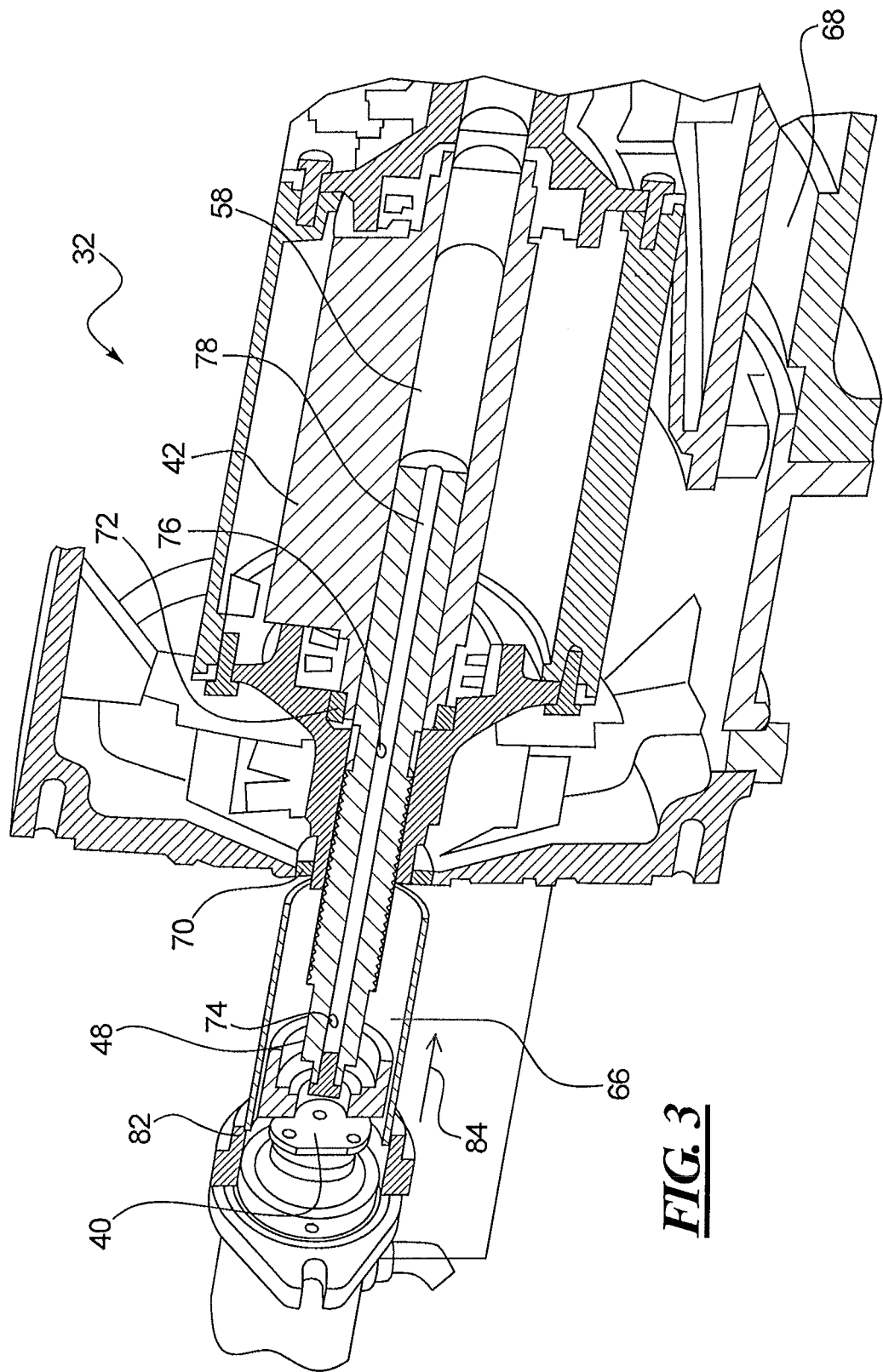
FIG. 3 shows a horizontally flipped portion of the vibratory system of FIG. 2 illustrating a key shaft and a lubrication system for lubricating the key shaft.

Referring now to FIG. 3, a portion of the vibratory system 32 is shown in greater detail, in accordance with at least some embodiments of the present disclosure. Specifically, as shown, the key shaft 48 may be connected to the linear actuator 40 for reciprocation within the bore 58 of the inner eccentric 46. Also shown are two lubricating oil cavities, namely, a spline oil cavity 66 that is employed for lubricating the key shaft 48 in a manner described below, as well as a main oil cavity (also referred to herein as a main pod oil cavity) 68 for lubricating the various components, such as, gearboxes, bearings and motors of the vibratory mechanism 34. In at least some embodiments, each of the spline oil cavity and the main oil cavity 66 and 68, respectively, may be located within the housing 42, although in other embodiments, one or both of those cavities may be provided separate from the housing and in operational association with the housing and the components housed therein.

Each of the spline oil cavity and the main oil cavity 66 and 68, respectively, may be distinct cavities separated from one another by way of seals 70 and 72. In at least some embodiments, each of the seals 70 and 72 may be lipped seals having a C-shaped cross-section, although in other embodiments, other types of seals, such as, various rubber seals, O-rings etc. that are suitable for separating the spline oil cavity 66 from the main oil cavity 68 may be employed. To further separate the spline oil cavity 66 from the main oil cavity 68 and to prevent intermixing of lubricating oil between the two cavities, the spline oil cavity may be positioned higher than the main oil cavity. Several conduits and channels (not visible) may be provided leading from the spline oil cavity 66 and the main oil cavity 68 to the key shaft 48 and the other components of the vibratory mechanism 34, respectively.

With respect to the lubricating oil that may be employed within each of the spline oil cavity 66 and the main oil cavity 68, any of a variety of lubricating oils may be used. For example, in at least some embodiments, synthetic oils, such as, polyalpha-olefin oils, synthetic ester oils, polyalkylene glycol oils, phosphate ester oils, alkylated naphthalene oils, silicate ester oils and ionic fluids may be employed. In other embodiments, other types of synthetic, vegetable and mineral oils for reducing corrosion, wear and tear, friction and for improving the efficiency and lifespan of the various working parts of the vibratory mechanism 34 may be employed. Furthermore, although synthetic and mineral oils are preferred due to their substantial constant viscosity, viscosity index and pressures at different temperatures, in at least some embodiments, bio-lubricant oils made from renewable materials may be employed as well. Additionally, in at least some embodiments, the same type of lubricating oil may be employed within each of the spline oil cavity 66 and the main oil cavity 68. In other embodiments, different types of lubricating oil may be employed within those oil cavities.

Lubrication through the main oil cavity 68 is performed in a known manner and, therefore, is not described here. On the other hand, to facilitate lubrication of the key shaft 48 using the spline oil cavity 66, the key shaft itself may be used as an oil pump to lubricate the splines on the axial splined portion 60 and the helical splined portion 62 of the key shaft. In this regard, and as shown in FIG. 4, the key shaft 48 may be designed with several lubricating (or oil) passages (or holes), such as, a first lubricating passage 74 and a second lubricating passage 76. In at least some embodiments, the first lubricating passage 74 may be provided on one of the smooth portions 64 of the key shaft and adjacent to a longitudinal lubricating passage 78 extending through an entire length of the key shaft. Relatedly, the second lubricating passage 76 may be provided on another of the smooth portions 64 of the key shaft 48 and positioned in between (or substantially in-between) the axial splined portion 60 and the helical splined portion 62. The longitudinal lubricating passage 78 also serves as a lubricating passage in a manner described below. Furthermore, each of the first and the second lubricating passages 74 and 76, respectively, may be positioned substantially transverse to the longitudinal lubricating passage 78 and designed to lead lubricating oil from within the key shaft 48 through the longitudinal lubricating passage to an outer surface 80 of the key shaft 48.

It will be understood that although not visible, similar lubricating passages corresponding to the first and the second lubricating passages 74 and 76, respectively, may be provided on the other side of the key shaft, at substantially 180° to the first and the second lubricating passages. Furthermore, although only two of the lubricating passages (not including the longitudinal lubricating passage) on each side of the key shaft 48 have been described, this need not always be the case. Rather, in at least some embodiments, only a single lubricating passage on one or both sides of the key shaft 48 or, possibly more than two lubricating passages may be employed. Moreover, the size and positioning of one or more of the lubricating passages (e.g., the first and the second lubricating passages 74 and 76, respectively) may vary.

In at least some embodiments, the first and the second lubricating passages 74 and 76, respectively, as well as the longitudinal lubricating passage 78 may be sized to minimize or at least substantially limit seal pressures at the seals 70, 72, as well as at another seal 82 employed for providing a sealing surface at the interface of the key shaft 48 and the linear actuator 40. In some of those embodiments, the first and the second lubricating passages 74 and 76, respectively, and the longitudinal lubricating passage 78 may be sized to limit the seal pressure to a maximum of seven (7) pounds per square inch (psi). The respective first and the second lubricating passages 74 and 76 and the longitudinal lubricating passage 78 may also be sized to ensure a proper and unrestricted flow of lubricating oil through those passages from the spline oil cavity 66, along the pathway indicated by arrow 84. In other embodiments, depending upon the type of the seals 70, 72 and 82 and pressures thereof, as well as the type of lubricating oil employed (to account for the change in viscosity of the oil with change in temperature), the length and width of the key shaft 48, the size of the first and the second lubricating passages 74 and 76, respectively, and the longitudinal lubricating passage 78 may change.

INDUSTRIAL APPLICABILITY

In general, the present disclosure sets forth a lubrication system and method to prevent premature spline wear on a key shaft. Such a key shaft may be on various industrial machines, including but not limited to vibratory compactors, loaders, track-type tractors, or any other work machine used in construction, agriculture, and industrial environments. To that end, the key shaft itself may be employed as an oil pump and provided with several lubricating passages through which lubricating oil may flow from a spline oil cavity to lubricate the axial and the helical splined portions of the key shaft.

In operation, as the key shaft reciprocates linearly within the bore of the inner eccentric, a pressure differential between the key shaft and the spline oil cavity is established. Due to these pressure differentials, lubricating oil from the spline oil cavity is drawn into the key shaft and specifically, lubricating oil is drawn into the longitudinal lubricating passage of the key shaft. As the key shaft extends into the bore, pressure differentials between the inside and the outside surfaces of the key shaft causes lubricating oil from within the longitudinal lubricating passage to be spilled out into the bore of the inner eccentric through the first and the second lubricating passages. When the key shaft retracts from the bore, the lubricating oil spilled into the bore contacts the axial splined portion and the helical splined portion of the key shaft, thereby lubricating those splines and reducing friction between those splines and the bore and the helical bore of the outer eccentric. Any remaining lubricating oil that did not spill into the bore during the extension phase may be drained back into the spline oil cavity.

As the key shaft continues the extension and retraction within the bore, the key shaft is used as an oil pump to continuously draw lubricating oil into the key shaft in a manner described above to lubricate the splines thereof. Several sensors and/or valves may be provided at the interface of the spline oil cavity and the entrance of the longitudinal lubricating passage of the key shaft to monitor and control the amount of lubricating oil entering the key shaft. Relatedly, sensors (e.g., level indicators) may be provided within the spline oil cavity to indicate when lubricating oil may fall below a certain level. Filters within the spline oil cavity and/or at the interface of the spline oil cavity and the key shaft may additionally be provided to filter the lubricating oil entering the key shaft.

Furthermore, although the above disclosure has been provided with respect to compaction machine, it will be understood that the system and method for reducing spline wear on the key shaft described above, may be employed in other applications as well that require key shaft lubrication.

By virtue of employing the key shaft itself as an oil pump, the key shaft can be effectively and sufficiently lubricated to prevent premature spline wear without any adverse effect on the performance of the key shaft and utilizing the components already present within the vibratory system. Furthermore, the above can be achieved in a cost effective manner. Thus, the present disclosure provides a mechanism for effectively lubricating the key shaft and minimizing wear and tear thereof.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A lubrication system for a key shaft of a compaction machine, the lubrication system comprising:
a housing having an inner eccentric defining a bore therein;
the key shaft positioned within the bore of the inner eccentric and reciprocating axially therein, the key shaft having a longitudinal lubricating passage extending through a substantial length of the key shaft and a plurality of additional lubricating passages intersecting the longitudinal lubricating passage, wherein the key shaft is an oil pump; and
a spline oil cavity positioned within the housing in fluid communication with the key shaft, wherein the axial motion of the key shaft causes oil to pump into the longitudinal lubricating passage and the plurality of additional lubricating passages.

2. The lubrication system of claim 1, wherein the key shaft further comprises an axial splined portion and a helical splined portion on an outer surface thereof.

3. The lubrication system of claim 2, wherein the axial splined portion is separated from the helical splined portion with a smooth portion.

4. The lubrication system of claim 1, wherein the plurality of additional lubricating passages comprises a first lubricating passage and a second lubricating passage, each of the first and the second lubricating oil passages defining a continuous passageway from the longitudinal lubricating passage within the key shaft to an outer surface of the key shaft.

5. The lubrication system of claim 4, wherein the first lubricating passage is defined adjacent to the longitudinal lubricating passage on a smooth portion of the key shaft and the second lubricating passage is defined substantially in between an axial splined portion and a helical splined portion of the key shaft.

6. The lubrication system of claim 1, further comprising a main oil cavity separated from the spline oil cavity by a plurality of seals.

7. The lubrication system of claim 6, wherein the spline oil cavity is positioned higher than the main oil cavity relative to a bottom of the housing.

8. The lubrication system of claim 6, wherein the plurality of seals comprises a first seal and a second seal.

9. The lubrication system of claim 6, wherein the longitudinal lubricating passage and each of the plurality of additional lubricating passages are sized to limit seal pressures to a maximum of 7 psi between a first side of each of the plurality of seals and a second side of each of the plurality of seals.

10. A lubrication system for a key shaft of a compaction machine, the lubrication system comprising:
a housing having an inner eccentric defining a bore therein;
the key shaft positioned within the bore of the inner eccentric and reciprocating axially therein, the key shaft having a longitudinal lubricating passage extending through a remaining length of the key shaft and a plurality of additional lubricating passages intersecting the longitudinal lubricating passage; and
a spline oil cavity positioned within the housing in fluid communication with the key shaft, wherein the reciprocating axial motion of the key shaft causes a pressure differential between the key shaft and the spline oil cavity during axial motion of the key shaft so that the key shaft pumps oil via the longitudinal lubricating passage.

11. The lubrication system of claim 10 wherein the key shaft is sealed at one end of the key shaft.

12. A method of lubricating a key shaft of a compaction machine, the method comprising:
providing an inner eccentric defining a bore therein;
positioning a key shaft partially within the bore, the key shaft having a first outer portion with a helical spline, a second outer portion with a straight spline, and a longitudinal lubricating passage extending through a length of the key shaft in fluid communication with a plurality of lubricating passages intersecting the longitudinal lubricating passage;
providing a spline oil cavity in fluid communication with the bore via the longitudinal lubricating passage and the plurality of lubricating passages of the key shaft;
reciprocating the key shaft longitudinally with the bore to cause a pressure differential of oil between the key shaft and the spline oil cavity; and
responsive to the pressure differential, lubricating the helical spline and the straight spline of the key shaft.

* * * * *